United States Patent [19]

Baumann

[11] Patent Number: 4,741,510

[45] Date of Patent: May 3, 1988

[54] FLOW CONTROL VALVE

[76] Inventor: Hans D. Baumann, 32 Pine St., Rye, N.H. 03870

[21] Appl. No.: 93,779

[22] Filed: Sep. 4, 1987

[51] Int. Cl.⁴ .............................................. F16K 7/16
[52] U.S. Cl. .................................... 251/205; 251/120; 251/126; 251/331
[58] Field of Search ............... 251/120, 126, 205, 208, 251/318, 331

[56] References Cited

U.S. PATENT DOCUMENTS

| | | | |
|---|---|---|---|
| 332,731 | 12/1885 | Miller | 251/331 |
| 2,280,411 | 4/1942 | Kiene | 251/331 |
| 2,537,308 | 1/1951 | Hansen | 251/331 |
| 2,627,387 | 2/1953 | Buickerood | 251/331 |
| 2,856,148 | 10/1958 | Heathcote et al. | 251/331 |
| 3,053,499 | 9/1962 | Jones | 251/331 |
| 3,095,905 | 7/1963 | Glauber | 251/331 |
| 3,269,410 | 8/1966 | Alvarado et al. | 251/331 |
| 4,179,096 | 12/1979 | Fromfield | 251/45 |
| 4,549,719 | 10/1985 | Baumann | 251/263 |

FOREIGN PATENT DOCUMENTS 1097893  7/1955  France ............................. 251/331

Primary Examiner—George L. Walton

[57] ABSTRACT

Flow Control Valve, capable of precisely regulating fluid flow, utilizing a part conical valve member having an integral flow passage which can be flattened by a sealing diaphragm motivated by a suitable actuating mechanism, whereby the flow passage within the valve member is closed.

5 Claims, 1 Drawing Sheet

U.S. Patent May 3, 1988 4,741,510
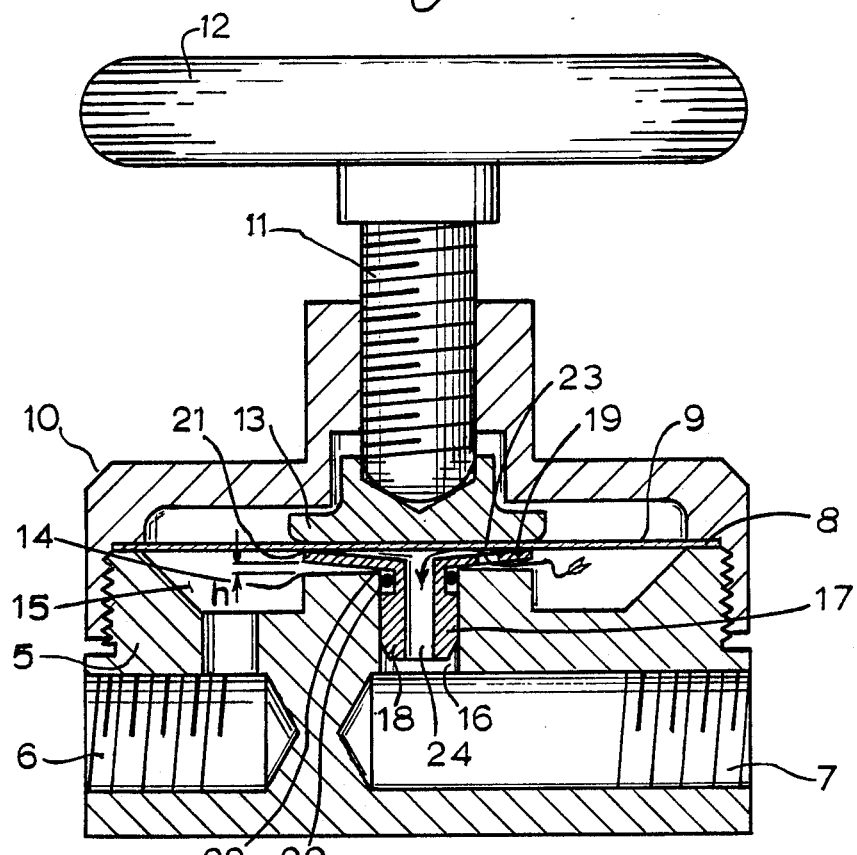
Fig. 1
Fig. 2
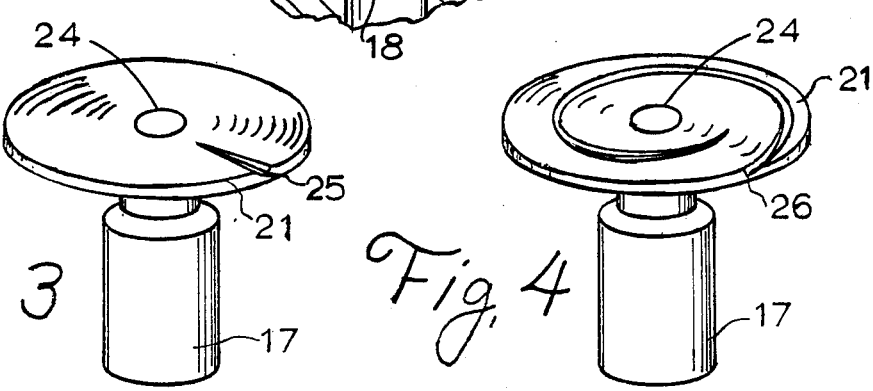
Fig. 3
Fig. 4

FLOW CONTROL VALVE

BACKGROUND OF THE INVENTION

This invention relates to automatic small flow control valves which can be used in place of needle valves for the fine control of liquid or gaseous fluid in a process system.

Quite often chemical processes require the control of corrosive or poisonous fluids. Conventional needle valves have stuffing boxes which are prone to leakage, which in turn can create a substantial health hazard to operating personnel.

Flow control valves using a diaphragm seal (see my U.S. Pat. No. 4,549,719) eliminate the need for packing. However, the travel is severely limited as it must stay within the elastic deflection range of the selected diaphragm material. This then excludes finely tapered, splined or grooved needle valve plugs, since these devices require a relatively large valve travel. Simple valve orifices shown in U.S. Pat. No. 4,549,719, again, are limited by the inability to drill small enough holes into a sometimes hard metal alloy. It is for this reason that the application of diaphragm sealed valves has been limited generally to a Cv number of 0.03 where the Cv coefficient defines the number of US gallons per minute of water passing an orifice or valve at a pressure loss of one pound per surface inch.

My present invention overcomes this limitation by providing for the insertion of a flexible valve member whereby the grooved portion which is normally located parallel to the cylindrical axis of a needle plug, is now located approximately parallel to the surface of the sealing diaphragm and therefore can be covered or uncovered by a relatively short motion of the sealing diaphragm.

Furthermore, by placing an opening through the conical portion of the valve member, a two stage throttling phenomena can be achieved which greatly limits the fluid velocity and associated erosion in such a valve.

Thirdly, the valve insert, as described later in more detail, can be easily exchanged with one of a different opening to suit the users preference for flowing quantities without the need to make time consuming adjustments, calibration or lapping.

All of these advantages are more clearly explained in the following detailed description.

DESCRIPTION OF DRAWINGS

FIG. 1 is a vertical, central, cross-sectional view showing a manually operated species of my invention with the valve element in the open position.

FIG. 2 shows the central portion of the valve depicted in FIG. 1, wherein the valve element is in the closed position.

FIG. 3 is an external isometric view of the valve member of my invention, when removed from the housing structure, showing a radially grooved flow passage.

FIG. 4 is an external isometric view of the valve member of my invention, when removed from the housing structure, showing a spiraled grooved as flow passage.

DESCRIPTION OF THE INVENTION

The subject invention comprises a housing 5 having two threaded ports 6 and 7 serving as either inlet or outlet passages.

The top portion of housing 5 terminates into an upper surface 8 which sealingly engages a flat diaphragm 9 typically made from a high tensil stainless steel or other alloy material. A threaded bonnet 10 compresses said diaphragm and in addition retains a threaded spindle 11 of a hand wheel 12 which by means of an anvil 13 is able to push diaphragm 9 downwards.

Housing 5 has a second, central, flat surface 14 being part of a raised portion within a cavity 15. A central port 16 connects between inlet and outlet passages 6 and 7. Slidingly engaged therein is a valve member 17 comprising a lower tubular extension 18 and an upper conical portion 19. The tubular extension 18, furthermore, retains an O-ring seal 20 capable of sealing the gap between the exterior of extension 18 and the wall surface of port 16.

In the configuration shown in FIG. 1, the upper portion of the outer conical wall portion 19 is in tight contact with the lower surface of sealing diaphragm 9 at rim 21 while the lower inner surface of the conical wall portion 19 is supported by the intersection 22 between the surface 14 and port 16. An orifice 23 is drilled into the conical wall portion 19 and is capable of conducting fluid between passage 6, via cavity 15, the hollow portion 24 of the tubular extension 18 and body passage 7. Any fluid passing through orifice 23 has to enter from a relatively narrow entrance portion (see flow arrow). There are therefore two successive throttling stages each having sharp 90° turns for the fluid to be controlled. This leads to a 40% reduction of fluid velocity necessary to achieve a desired pressure reduction. This in turn will reduce the possibility of erosion, cavitation or other undesirable throttling phenomena.

When hand wheel 12 is turned and anvil 13 presses diaphragm 9 downward, the distance "h" between conical wall portion 19 and flat surface 14 is gradually reduced leading to a linear decrease in the exposed flow area passages 23 until, as shown in FIG. 2, "h" is reduced to zero and the flow passage is closed completely.

Where it is impractical to drill a small enough hole for passage 23, my invention provides for alternative configurations of valve member 17. In FIG. 3, the flow passage used to conduct fluid from cavity 15 to opening 24 can be a groove 25 extending radially inward from rim 21. Typically, this groove has a triangular cross-section which diminishes in depth when approaching opening 24.

In an alternative arrangement, a groove is machined in a spiral geometry 26, commencing with its largest cross-sectional profile where it penetrates rim 21 and ending its depth in close vicinity to opening 24 (see FIG. 4). The latter configuration has some production merits since the spiralled groove can be cut on an engine lathe and does not require a separate milling operation. Furthermore, the fluid is forced to travel through an extended length of passageway expending considerable dynamic energy through wall friction, leading again to desired reduction in fluid velocity for a desired pressure loss.

In the foregoing example, my invention is illustrated as being operated by a hand wheel, however, in an automated process, hand wheel 12 would be replaced by a suitable pneumatic or electrical operating device as typically shown in my U.S. Pat. No. 4,684,103.

Finally, it is possible to omit the tubular extension 18 of valve member 17 and invert the conical portion 19 so that rim 23 is supported by surface 14 while sealing dipahragm 9 compresses the central periphery around hole 24.

These and numerous other changes such as using differently shaped flow passages in valve member 17 from those illustrated are possible without violating the scope of the following claims:

I claim:

1. Flow Control Valve comprising a valve housing having an upper terminal surface; a second central, flattened surface extending parallel below said upper terminal surface, at least one inlet and one outlet passage; a sealing diaphragm suitably retained on top of said upper terminal surface of the valve housing; actuating means capable of moving said sealing diaphragm; a port connecting said inlet and outlet passages and extending perpendicular to said central, flattened surface of the body; a valve insert member comprising a conical wall portion having at least one flow passage therein and having a central bore and capable of being elastically deformed to assume a flattened shape upon movement of said actuating means thereby progressively opening and closing said flow passage said conical wall having an inner and an outer periphery, one of whose periphery is in contact with said sealing diaphragm and whose other periphery is supported by said central, flattened housing surface; when said conical wall and said diaphragm is in a fully open position, said conical wall being deformed upon moving said actuating means and progressively closing said at least one flow passage as said diaphragm engages a larger portion of said conical wall and as said conical wall engages a larger portion of said flattened housing surface.

2. Flow Control Valve as described in claim 1, wherein said flow passage comprises at least one circular bore extending perpendicularly through the conical wall portion of said valve member.

3. Flow Control Valve as described in claim 1, wherein said flow passage comprises a groove extending radially inwardly from the upper, outer periphery of said conical wall portion and wherein the depth of said groove gradually diminishes toward the center of said conical wall portion.

4. Flow Control Valve as described in claim 1, wherein said flow passage comprises a groove extending in a spiral fashion from the outer, upper periphery of said conical wall portion toward its center and wherein the depth of said groove gradually diminishes towards the same center.

5. Flow Control Valve as described in claim 1, wherein said valve insert member further comprises a central, tubular extension guidingly engaged within said port and wherein a suitable fluid seal is arranged to block fluid passage between the inner wall of said port connecting the inlet and outlet passages and the exterior of the central, tubular extension of said valve member.

* * * * *